US007783588B2

(12) United States Patent
Ramsey et al.

(10) Patent No.: US 7,783,588 B2
(45) Date of Patent: Aug. 24, 2010

(54) CONTEXT MODELING ARCHITECTURE AND FRAMEWORK

(75) Inventors: William D. Ramsey, Redmond, WA (US); Jianfeng Gao, Beijing (CN); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 916 days.

(21) Appl. No.: 11/253,866

(22) Filed: Oct. 19, 2005

(65) Prior Publication Data

US 2007/0112546 A1 May 17, 2007

(51) Int. Cl.
*G06F 17/00* (2006.01)
*G06N 5/02* (2006.01)

(52) U.S. Cl. .......... 706/48

(58) Field of Classification Search .......... 706/48
See application file for complete search history.

(56) References Cited

U.S. PATENT DOCUMENTS 6,477,531 B1* 11/2002 Sullivan et al. .......... 707/10
2002/0194164 A1* 12/2002 Morrow et al. .......... 707/3
2004/0044635 A1 3/2004 Gordon et al. .......... 706/50
2004/0243588 A1* 12/2004 Tanner et al. .......... 707/100
2005/0203883 A1 9/2005 Farrett .......... 705/3

OTHER PUBLICATIONS

'Google pocket guide': Calishain, 2003, O'Reilly, p. 6-7, 10-11, 22-23, 60-61.*

'OpenOffice.org for Dummies': Leete, 2004, Wiley Publishing Inc.*

U.S. Appl. No. 11/123,277, filed May 6, 2005, entitled "Performant Relevance Improvements in Search Query Results", application currently pending, pp. 1-28.

U.S. Appl. No. 10/752,901, filed Jan. 7, 2004, entitled "System & Method for Blending the Results of a Classifier & a Search Engine", application currently pending, pp. 1-26.

U.S. Appl. No. 11/133,549, filed May 20, 2005, entitled "Adaptive Customer Assistance System for Software Products", application currently pending, pp. 1-35.

Q135174- Cannont Access CD-ROM Drive from MS-DOS Mode or Command Prompt, http://web.archive.org/web/20010209153547/support.microsoft.com/support/kb/articles/Q135/1/74.ASP, Sep. 19, 2007.

* cited by examiner

*Primary Examiner*—Donald Sparks
*Assistant Examiner*—Peter Coughlan
(74) *Attorney, Agent, or Firm*—Westman, Chaplin & Kelly, P.A.

(57) ABSTRACT

A context modeling architecture that includes a context representation portion, which adapted to represent context as features, is provided. The features are specifiable at runtime of an application including the context representation portion.

18 Claims, 4 Drawing Sheets

CONTEXT MODELING ARCHITECTURE AND FRAMEWORK

BACKGROUND

Most software products/applications are designed to include some type of help or customer assistance facility. These help facilities are usually designed integrally within the software application and, in general, explain various components of the software application. Early help systems were only capable of displaying the same information (or static information), regardless of the context or circumstances surrounding the request for help. More recent help systems provide context-sensitive help, which provides the users with the specific help topic for the context to which it relates. For example, in a word processing application, if the user is editing a document and selects a command such as "FILE" from the drop-down menu and further presses a function key such as "F1" for HELP, a context-sensitive facility opens a window explaining the functions offered under the drop-down menu.

The above-described help facilities clearly have several advantages over searching through printed documentation for help, which may be disruptive and very time consuming. Further, the context-specific help is relatively easy to use and provides information that is focused on a desired context.

However, in current software applications that provide context specific help, context objects typically need to be specified ahead of deployment of the software application. Further, it is usually required that both the application and platform, on which the application runs, have full knowledge about the context objects. This, in general, makes it relatively difficult to use context on a wide scale, for example, to predict user intent and thereby provide better user assistance in software applications.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter Embodiments of the present invention utilize arbitrary strings as context, thereby allowing substantially unlimited flexibility in what can be represented as context. Each string forms a "feature" which can then be used in subsequent analysis. If there is a pattern that a certain feature is commonly followed by, or associated with, an asset (a particular help file, for example), then a reasoning module will notice this pattern and use the feature to predict the occurrence of the asset. However, if a certain feature is seen with many assets, its predictive power will be diminished accordingly.

DETAILED DESCRIPTION

Embodiments of the present invention relate, in general, to modeling context. More specifically, embodiments of the present invention provide a context handling system in which context is represented as arbitrary strings. This allows for great flexibility in what can be represented as context. However, before describing the present invention in greater detail, one illustrative embodiment in which the present invention can be used will be discussed.

Figure 1:
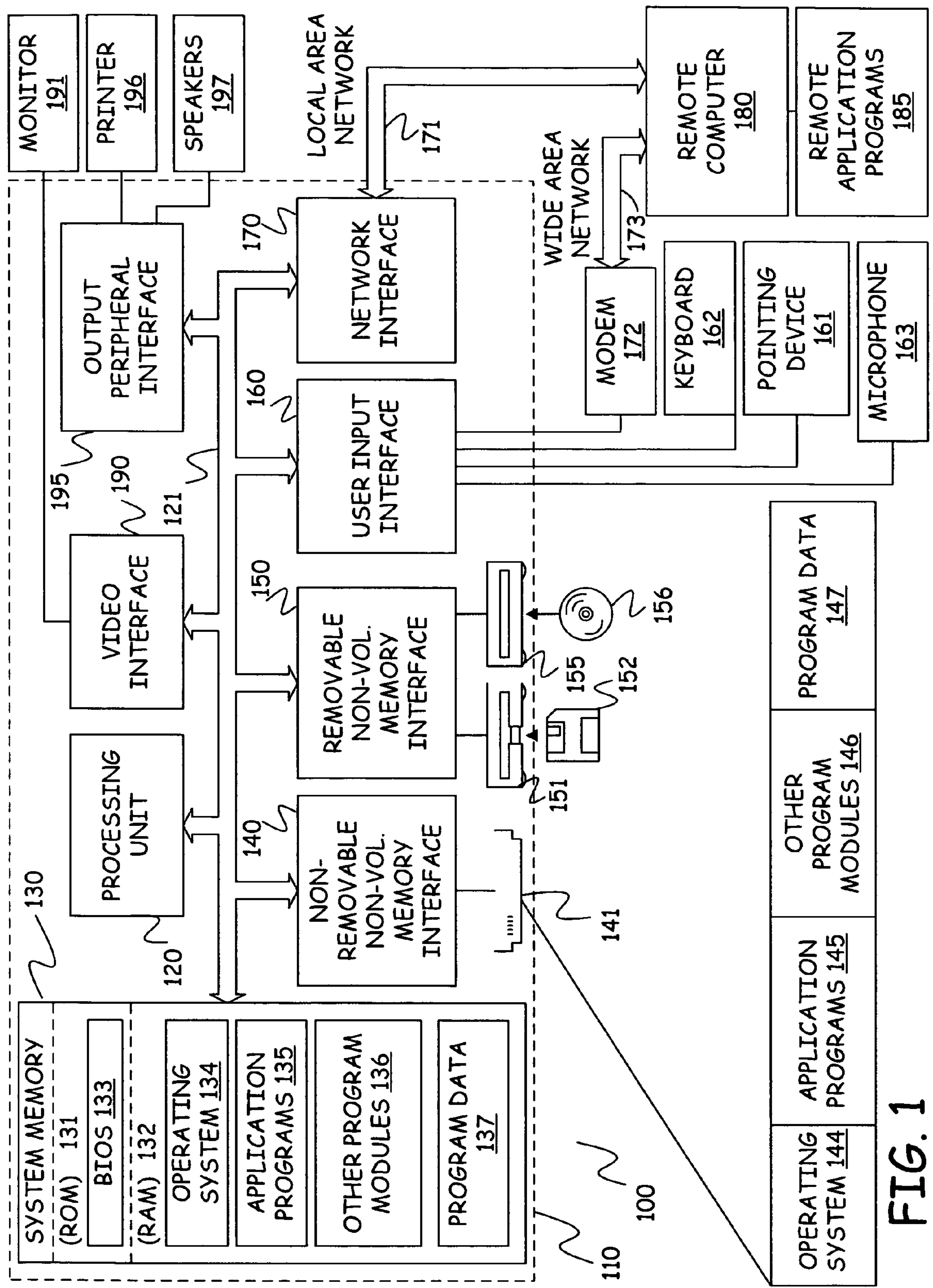
FIG. 1 is a block diagram of one illustrative computing environment in which the present invention can be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
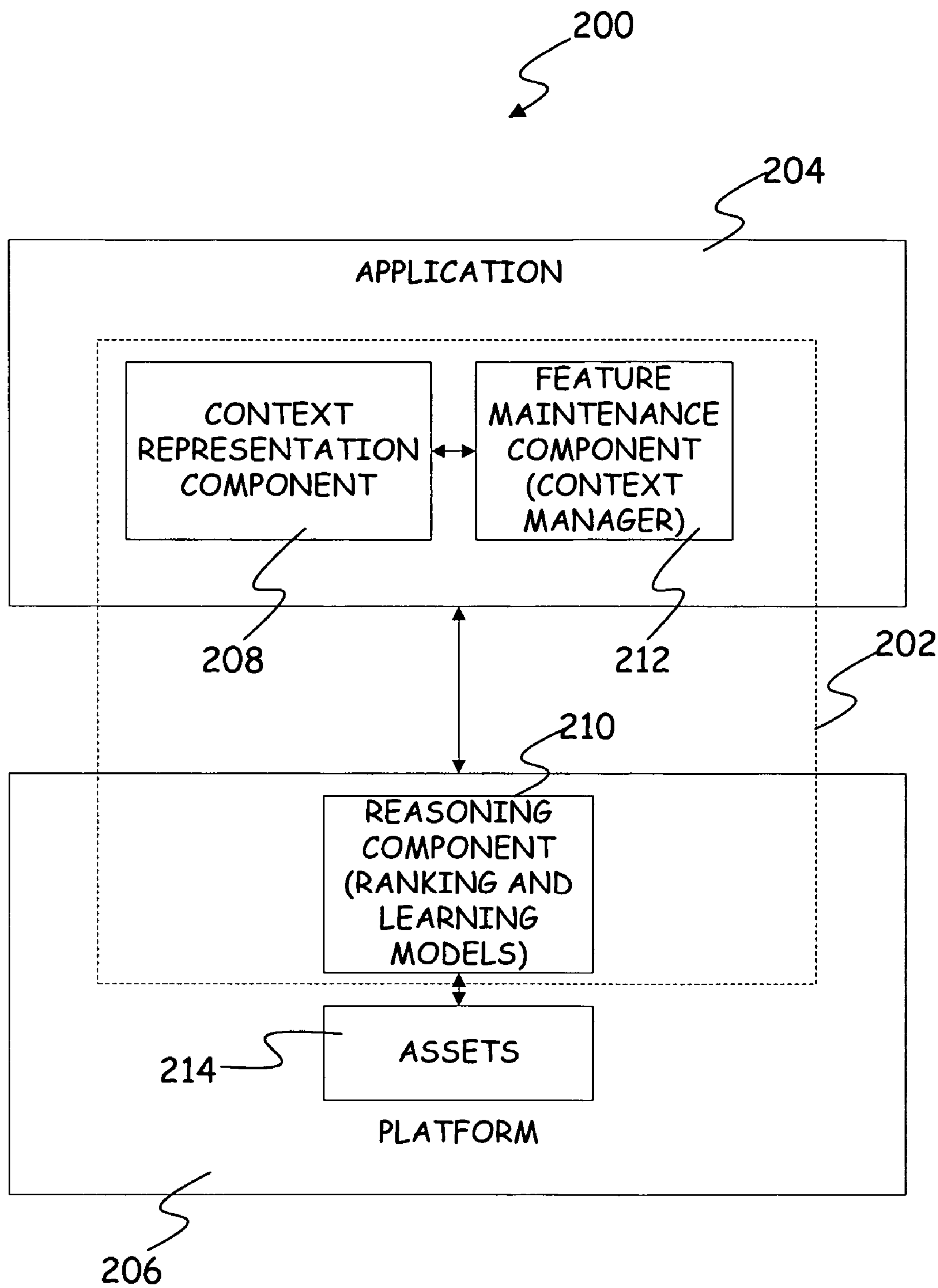
FIGS. 2 through 5 are simplified block diagrams of software systems that utilize context handling systems in accordance with embodiments of the present invention.

FIG. 2 is a simplified block diagram of a software system 200 that includes a context handling system 202 in accordance with an embodiment of the present invention. Software system 200 includes an application 204 and a platform 206 on which the application 204 runs. As can be seen in FIG. 2, context handling system 202 has components within application 204 and platform 206.

Application 204, in general, is a software application (or a group of related software applications) that has several tasks/functions/actions that have some relationship to each other. For example, if application 204 is a word processor, tasks/functions/actions that have at least some relationship to each other include creating a new file, opening an existing file, entering text in a file, selecting some or all text in a file, etc. In such applications, knowing previous actions carried out by users helps predict the likelihood of their next actions. For example, a user who has just selected some text is probably more likely to be executing a "Bold" action next rather than a "Zoom" action.

Embodiments of context handling system 202 of the present invention characterize context as anything that helps predict the intent of the user and address one or more of the following difficulties with using context:

1. Modeling context so that it is relatively easy for application developers to use.
2. Reasoning over the context to provide better results.
3. Learning which pieces of context are important and which ones are not.

The above difficulties with utilizing context, in general, are addressed by embodiments of the present invention by dividing context handling system 202 into two primary components. One of the two components is a context representation framework/component 208, which can take generic strings as features that do not need to be specified prior to runtime of application 204. The other primary component is a mathematical framework or reasoning component 210 that deals with arbitrary features in a principled manner and has the ability to learn which features are important and which ones are not.

More specifically, embodiments of the present invention break context into a set of features that represent the "state" of an application (such as 204) and the "history" of the application. State is used to describe a snapshot of the application and may include what processes are running on the machine, what applications are open, whether there are tables or charts loaded in a document, whether a certain toolbar is shown, or anything else that might help represent what functions are enabled. History is used to describe what the user has done and might include items such as that the last action was selecting text or clicking on a table, or that previous actions included inserting a table, bolding text, or any other action the user might have performed. Collectively, the "state" and "history" context form a set of features that can then be reasoned over. The state and history features are created and managed by context representation component 208 and feature maintenance component 212. In some embodiments of the present invention, feature maintenance component 212 can be within platform 206 instead of being a part of application 204. Example features that can be created and used to provide user assistance in a word processing application are included below.

Suppose a user has a word processing application named "Word Processor 1" open and was trying to insert a table of contents but did not know how to carry out this function. The user might try to accomplish this by clicking on, for example, a menu item "Table" followed by a menu item "Insert" followed by a menu item "Table." In this scenario, context can be represented (in context representation component 208 and context maintenance component 212) by

```
State Features = {"Word Processor 1"}
History Features = {"MenuItem_Table1",
                    "MenuItem_Insert",
                    "MenuItem_Table2"}
```

The user would not see anything signifying the table of contents and might go into an online help system, for example, to find out what to do. If the user types the word "contents" as a query in the help system and submits the query, the entire packet sent to the reasoning system (such as 206) is:

```
Query = {"contents"}
State Features = {"Word Processor 1"}
History Features = {"MenuItem_Table1",
                    "MenuItem_Insert",
                    "MenuItem_Table2"}
```

The results that get returned from the help system can:

Contain at least one mention of "contents" because of the query.

Be biased towards Word Processor 1 help because of the State.

Probably have some correlation with what previous users have been looking for after they had pressed the same menu items.

Thus, help can return documents (from assets 214) on how to create a table of contents because it contains "contents" in the title, is specific to Word Processor 1, and there are probably many users who tried to find how to insert a table of contents by browsing through the "Table" menus.

Mathematically, reasoning system 210 of context handling system 208 is configured to determine the probability of an asset given a set of features (P(asset|features)). In the equations below, notation P(X) represents the probability of X and P(X|Y) represents the probability of X given Y. In the example provided above, the "asset" was a help document about inserting a table of contents and the "features" were the State and History items. It should be noted that the feature set could be expanded to include other strings or data types.

In general, once there are a set of features, the P(asset|features) can be obtained using a variety of techniques such as Naive Bayes, which is expressed as:

$$P(\text{asset} \mid \text{features}) = P(\text{features} \mid \text{asset}) * P(\text{asset}) / P(\text{features}) \quad \text{Equation 1}$$

where * represents multiplication and/represents division. Since the denominator P(features) in Equation 1 is common each P(feature|asset) and P(asset) product, Equation 1 can be approximated as follows:

$$P(\text{asset} \mid \text{features}) \sim P(\text{feature\_1} \mid \text{asset}) * P(\text{feature\_2} \mid \text{asset}) * \ldots * P(\text{asset}) \quad \text{Equation 2}$$

An example embodiment of reasoning component 210 can implement Equation 2.

In alternative embodiments, a Maximum Entropy framework described by Equations 3 and 4 below can be used. In Equations 3 and 4 below, exp represents an exponential function and Σ represents summation.

$$P(\text{asset}|\text{features}) = \exp(\Sigma\lambda_i f_i)/Z(\text{features}) \quad \text{Equation 3}$$

$$Z(\text{features}) = \Sigma[\exp(\Sigma\lambda_i f_i)] \quad \text{Equation 4}$$

where each feature $f_i$ gets assigned a "weight" $\lambda_i$ that predicts the probability of the asset. Z is a normalization term that ensures that the probabilities of assets all sum to unity.

It will be recognized that the features can be expanded to include terms in the query or any other arbitrary feature set without requiring modification to the basic algorithm and infrastructure. Also, suitable techniques for computing P(asset|features) are not limited to the example techniques above.

As noted earlier, reasoning component 210 is capable of learning which pieces of context are important. More specifically, the feature weights or probabilities are learned from user data thus reducing the cost of development when context features are use. The learning is conducted using any standard methodology (iterative scaling, etc.) based upon what assets users selected given a feature set. For example, if 90% of the time that users with a feature "MenuItem_Table2" selected the asset "Create a Table of Contents" the system would learn that P("Create a Table of Contents"|feature=" MenuItem_Table2") ~90%. Given many feature sets and many selected assets, it becomes possible to create a mathematical model that maximizes the relevance. Different configurations for handling features and for transferring assets between application 204 and platform 206 are described below in connection with FIG. 3, 4 and 5.

Figure 3:
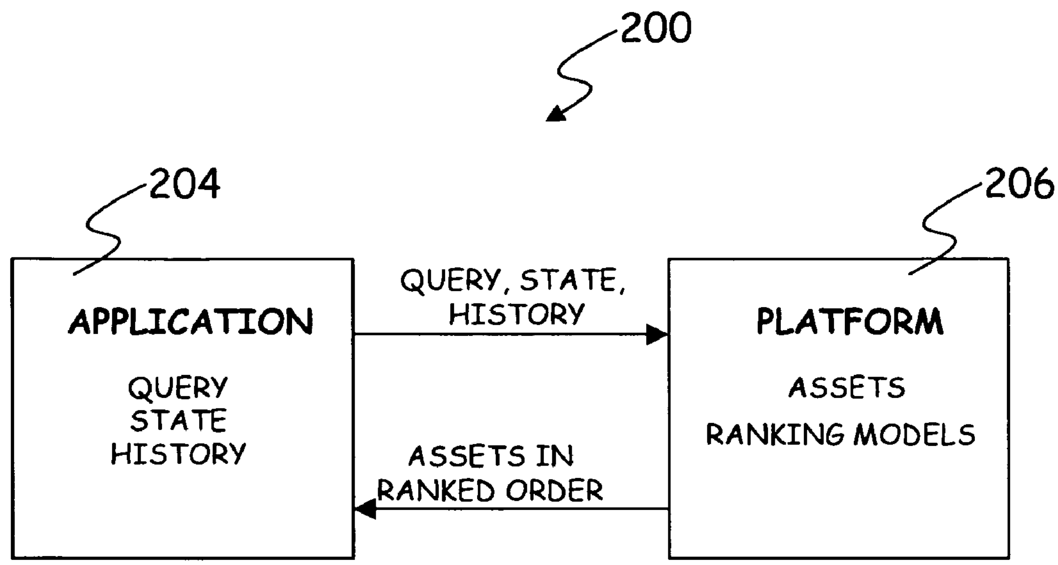

The configuration shown in FIG. 3, which is substantially similar to the configuration shown in FIG. 2, requires application 204 to maintain a list of state and history features. Platform 206 is therefore passed a list of features and requires application 204 to know what features to keep and what features to discard in terms of history. As can be seen in FIG. 3, platform 206 receives a query, state features and history features from application 204 and responsively returns assets in ranked order to application 204.

Figure 4:
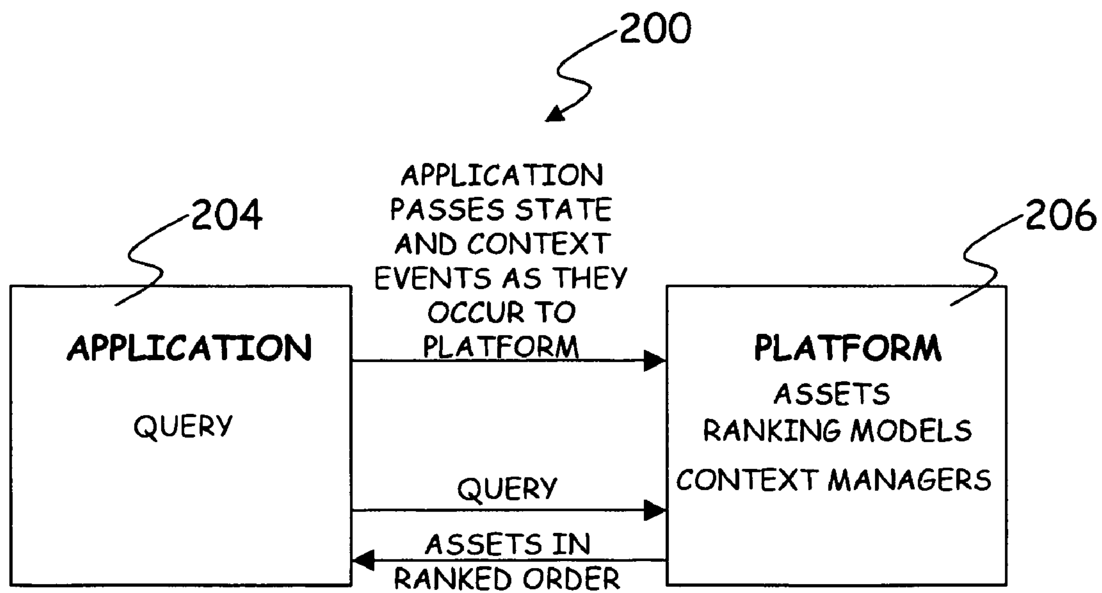

The configuration in FIG. 4 requires application 204 to pass state and history features to platform 206 where platform 206 maintains a feature list and determines how long to save features. A history of queries can also be saved. The configuration of FIG. 4 is in contrast with that of FIG. 3, which, as noted above, maintains/manages context (state and history features) in application 204 instead of in platform 206.

Figure 5:
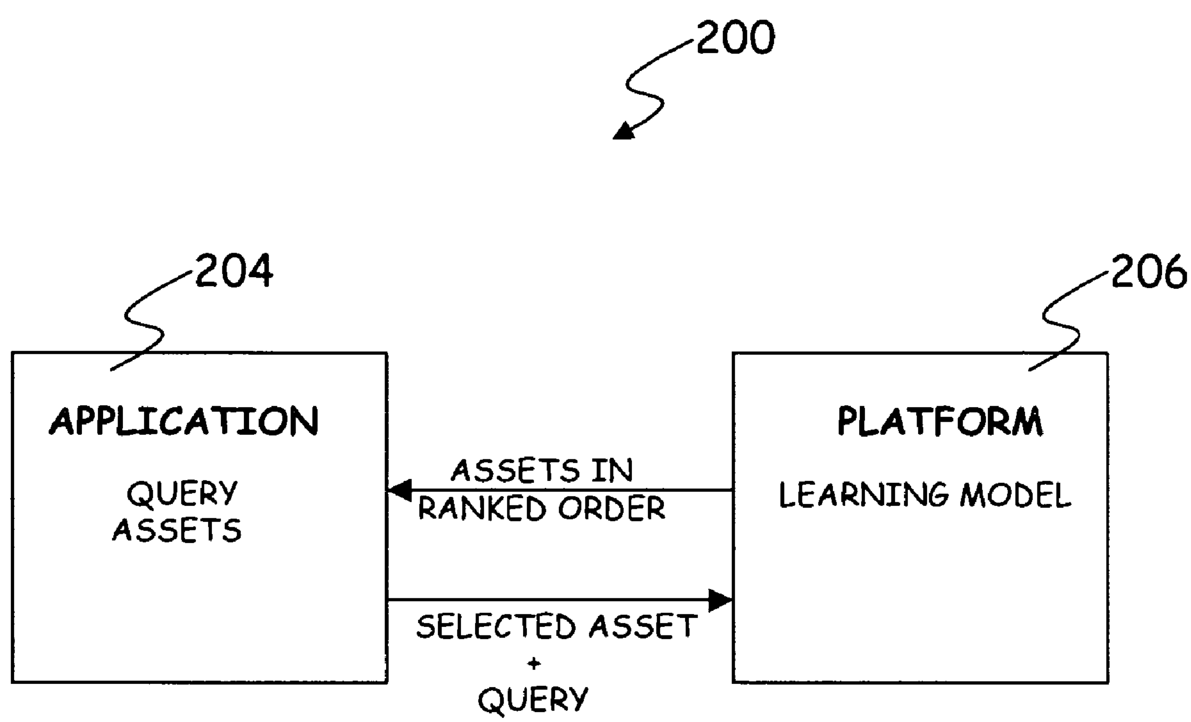

FIG. 5 is a simplified block diagram that illustrates the learning function carried out in embodiments of the present invention. In essence, after getting assets in ranked order, application 204 notifies platform 206 about which asset was viewed and/or selected. Platform 206 then adjusts existing models to maximize the relevance of the assets with respect to stored queries and context.

It should be noted that the reasoning platform (such as 206) can exist in a completely different process (and maybe even a different machine) than the application (such as 204). Further, in the above examples, any suitable scoring scheme can be used in connection with ranking assets, and utilizing the probability of an asset is only a specific example.

In summary, embodiments of the present invention provide a simple and flexible mechanism for applications to represent context (as a set of features), collect it and pass it into a reasoning system, and have the reasoning system adapt to what users actually do in order to learn which pieces of context are important. An additional benefit of using arbitrary string features is that context can change over time in that certain features might cease to occur and certain features might come into prominence. For example, a new release of a product might introduce a new feature and remove older features and this method of representing features is flexible enough to retain elements of the old model that still apply and adapt to the new features introduced. In general, the models will adjust to any features that might occur at a given point in time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implementable context handling system that is capable of handling context within an application that surrounds a request for help about the application, the computer-implementable context handling system comprising:

a context representation portion adapted to represent the context within the application that surrounds the request for help about the application as features, the context representation portion comprising computer readable instructions stored on a computer storage medium and executable by a processor, wherein the features, which each comprise at least one string, are specifiable at runtime of the application including the context representation portion, and wherein the application is executable by the processor, and wherein at least one of the features represents a snapshot of the application, and wherein the snapshot of the application is described by at least one arbitrary string, and wherein the features, which each comprise at least one string, represent the context within the application that surrounds the request for help about the application and are separate from the request for help and any field in which the request for help is entered, and wherein the features are modifiable over time.

2. The context handling system of claim 1 and further comprising a reasoning portion adapted to analyze the features.

3. The context handling system of claim 2 wherein the reasoning portion is further configured to rank assets based on the features.

4. The context handling system of claim 2 wherein the reasoning portion is further configured to develop learning models based on assets that are selected by users.

5. The context handling system of claim 2 and wherein the reasoning portion is a part of a platform, which is separate from the application.

6. The context handling system of claim 5 wherein the features comprise state features and history features and wherein the at least one of the features that represents the snapshot of the application is a part of the state features.

7. The context handling system of claim 6 and further comprising a feature maintenance portion configured to maintain a list of state and history features.

8. The context handling system of claim 7 and wherein the feature maintenance portion is a part of the application.

9. The context handling system of claim 7 and wherein the feature maintenance portion is a part of the platform.

10. A computer-implementable method of predicting user intent from context within an application that surrounds a request for help about the application, the computer-implementable method comprising:

representing, using a processor, context within the application that surrounds the request for help about the application as a set of features, with each feature of the set of features being represented by a string; and determining, using the processor, a score of an asset given the set of features, wherein the set of features comprise state features and history features, and wherein at least one feature of the set of features represents a snapshot of the application, and wherein the snapshot of the application is described by at least one arbitrary string; and wherein the at least one feature of the set of features that represents the snapshot of the application is one of the state features, and wherein the set of features, with each feature of the set of features represented by the string, represent the context within the application that surrounds the request for help about the application and is separate from the request for help and any field in which the request for help is entered, and wherein the set of features are modifiable over time.

11. The method of claim 10 wherein the score of the asset uses probability of the asset.

12. The method of claim 10 and further comprising utilizing the score of the asset to help predict user intent.

13. A computer system comprising:

an application having a context representation module adapted to represent context within the application that surrounds a request for help about the application as features that each comprise at least one string, wherein the application is stored on at least one data storage medium of the computer system, and wherein the application is executed by at least one processor of the computer system; and a platform comprising a reasoning component configured to analyze the features, the reasoning component is stored on the at least one data storage medium of the computer system and executed by the at least one processor of the computer system, wherein at least one of the features represents a snapshot of the application, and wherein the snapshot of the application is described by at least one arbitrary string, and wherein the features, which each comprise at least one string, represent the context within the application that surrounds the request for help about the application and are separate from the request for help and any field in which the request for help is entered, and wherein the features are modifiable over time.

14. The system of claim 13 wherein the reasoning component is further configured to rank assets based on the features.

15. The system of claim 13 wherein the features are specifiable after the application is deployed.

16. The system of claim 13 wherein the features comprise state features and history features and wherein the at least one of the features that represents the snapshot of the application is a part of the state features.

17. The system of 13 wherein the features are maintained in the application.

18. The system of claim 13 wherein the features are maintained within the platform.

* * * * *